United States Patent
Hino

(10) Patent No.: US 10,975,239 B2
(45) Date of Patent: Apr. 13, 2021

(54) POLYCARBONATE RESIN COMPOSITION AND MOLDED ARTICLE

(71) Applicant: Mitsubishi Engineering-Plastics Corporation, Minato-ku (JP)

(72) Inventor: Kosei Hino, Hiratsuka (JP)

(73) Assignee: Mitsubishi Engineering-Plastics Corporation, Minato-ku (JP)

(*) Notice: Subject to any disclaimer, the term of this patent is extended or adjusted under 35 U.S.C. 154(b) by 84 days.

(21) Appl. No.: 16/462,964

(22) PCT Filed: Oct. 18, 2017

(86) PCT No.: PCT/JP2017/037622
§ 371 (c)(1),
(2) Date: May 22, 2019

(87) PCT Pub. No.: WO2018/116607
PCT Pub. Date: Jun. 28, 2018

(65) Prior Publication Data
US 2020/0071519 A1 Mar. 5, 2020

(30) Foreign Application Priority Data

Dec. 19, 2016 (JP) .............................. JP2016-245675
Dec. 19, 2016 (JP) .............................. JP2016-245676
Aug. 9, 2017 (JP) .............................. JP2017-154270

(51) Int. Cl.
C08L 69/00 (2006.01)

(52) U.S. Cl.
CPC ........... *C08L 69/00* (2013.01); *C08L 2201/08* (2013.01); *C08L 2205/025* (2013.01); *C08L 2205/03* (2013.01); *C08L 2205/18* (2013.01)

(58) Field of Classification Search
USPC ....................................... 523/201
See application file for complete search history.

(56) References Cited

U.S. PATENT DOCUMENTS

| 6,384,114 | B1 | 5/2002 | Nodera |
| 6,423,766 | B1 | 7/2002 | Itagaki |
| 6,441,068 | B1 | 8/2002 | Eckel et al. |
| 2015/0079324 | A1* | 3/2015 | Nii .......................... C08L 51/04 428/36.92 |
| 2017/0037220 | A1 | 2/2017 | Tani et al. |

FOREIGN PATENT DOCUMENTS

| JP | 8-259791 A | 10/1996 |
| JP | 11-21441 A | 1/1999 |
| JP | 2001-123056 A | 5/2001 |
| JP | 3638806 B2 | 4/2005 |
| JP | 4080851 B2 | 4/2008 |
| JP | 4157271 B2 | 10/2008 |
| JP | 2014-80602 A | 5/2014 |
| JP | 2014-98094 A | 5/2014 |
| JP | 2014-125597 A | 7/2014 |
| JP | 2015-48421 A | 3/2015 |
| JP | 2015-129212 A | 7/2015 |
| WO | WO 2015/163268 A1 | 10/2015 |

OTHER PUBLICATIONS

International Search Report dated Jan. 16, 2018 in PCT/JP2017/037622 filed on Oct. 18, 2017.

* cited by examiner

*Primary Examiner* — Terressa Boykin
(74) *Attorney, Agent, or Firm* — Oblon, McClelland, Maier & Neustadt, L.L.P.

(57) ABSTRACT

Provided is a polycarbonate resin composition that exhibits an excellent flame retardancy and impact resistance as well as an excellent hue and moist heat resistance. The polycarbonate resin composition characteristically contains, per 100 mass parts of a polycarbonate resin (A), 0 to 40 mass parts of a graft copolymer (B) comprising an aromatic vinyl monomer component (b1), a vinyl cyanide monomer component (b2), and a diene rubber polymer component (b3); 10 to 30 mass parts of a phosphate ester compound (C); 0.001 to 1.0 mass parts of a phosphite antioxidant (D); and 0.00001 to 0.1 mass parts of 2,4-di-tert-butylphenol (E).

11 Claims, No Drawings

POLYCARBONATE RESIN COMPOSITION AND MOLDED ARTICLE

TECHNICAL FIELD

The present invention relates to a polycarbonate resin composition and a molded article and more particularly relates to a polycarbonate resin composition and molded article that exhibit an excellent flame retardancy, impact resistance, and heat stability as well as an excellent hue and moist heat resistance.

BACKGROUND ART

Polycarbonate resins exhibit, e.g., an excellent transparency, impact resistance, heat resistance, and dimensional stability as a commodity engineering plastic, and as a consequence of these excellent characteristics are broadly used industrially as raw materials in the automotive sector, the office automation equipment sector, the electrical and electronics sectors, and so forth.

There is strong demand for imparting flame retardancy to resin materials with a focus on applications such as office automation equipment, household appliances, consumer electronics, and so forth, and in order to respond to this demand, a large amount of art has been introduced whereby flame retardancy is imparted by blending, for example, a halogen compound, phosphorus compound, siloxane compound, polyfluoroethylene, and so forth, into polycarbonate resin.

For example, PTL 1 teaches that a resin composition having an excellent impact resistance and flame retardancy is obtained through the incorporation in polycarbonate resin of a prescribed phosphate ester compound and a composite rubber-type graft copolymer having a polyorganosiloxane component and a polyalkyl (meth)acrylate rubber component. PTL 2 describes a resin composition provided by blending a phosphorus flame retardant, a polyfluoroethylene resin, and a prescribed multilayer-structured polymer into an aromatic polycarbonate resin. This resin composition exhibits an improved appearance and an excellent flame retardancy, heat stability, and impact resistance and as a consequence is useful for large molded articles and thin molded articles. PTL 3 describes, as a material exhibiting an excellent impact resistance, moldability, and flowability, a flame-retardant resin composition containing a polycarbonate resin, a composite rubber-type graft copolymer, a phosphate ester compound, and a polytetrafluoroethylene.

With the goal of achieving, e.g., smaller size, lower weight, and higher performance, the molded articles for office automation equipment, household appliances, consumer electronics, and so forth have been getting thinner year-to-year and the properties required of them have been undergoing qualitative increases. Polycarbonate resin compositions are thus being required to exhibit flame retardancy and impact resistance as well as a heat stability that can withstand high-temperature molding, but in addition an excellent hue and moist heat resistance.

In addition, flame-retarded polycarbonate/styrenic resin alloy compositions are advantageously used for members in, e.g., electrical equipment, electronic equipment and devices, office automation equipment, and information devices, such as computers, notebook personal computers, various mobile devices, printers, copiers, and so forth.

Among these, polycarbonate/styrenic resin alloy compositions that have been flame-retarded using a phosphorus flame retardant exhibit an unusually good moldability due to the plasticizing effect of the phosphorus flame retardant and as a result are the compositions most commonly used to obtain thin molded articles as well as large molded articles (refer to, for example, PTL 4 to PTL 6).

However, with the goal of achieving, e.g., smaller size, lower weight, and higher performance, the molded articles for office automation equipment, household appliances, consumer electronics, and so forth have in particular been getting thinner year-to-year. The processing temperature must thus be increased in order to obtain an enhanced moldability, and in addition the residence times are becoming longer. As a consequence, problems have occurred with the aforementioned polycarbonate/styrenic resin alloys, i.e., a high impact strength cannot be maintained, or discoloration occurs and a molded article having a desirable hue is then not obtained.

There is thus demand for a polycarbonate/styrenic resin alloy that exhibits flame retardancy and impact resistance as well as a heat stability that can withstand high-temperature molding, and that also exhibits an excellent hue and moist heat resistance.

CITATION LIST

Patent Literature

[PTL 1] JP H08-259791 A
[PTL 2] JP 2001-123056 A
[PTL 3] JP H11-21441 A
[PTL 4] Japanese Patent No. 3,638,806
[PTL 5] Japanese Patent No. 4,080,851
[PTL 6] Japanese Patent No. 4,157,271

SUMMARY OF INVENTION

Technical Problem

An object of the present invention (problem to be addressed by the present invention) is to provide a polycarbonate resin composition and molded article that exhibit an excellent flame retardancy and impact resistance as well as an excellent hue and moist heat resistance, while also having a heat stability that can withstand high-temperature molding.

Solution to Problem

As a result of extensive and intensive investigations in order to address the aforementioned problem, the present inventor discovered that this problem could be solved by the incorporation, in prescribed amounts, of a phosphate ester compound, a phosphite antioxidant, and also 2,4-di-tert-butylphenol in a polycarbonate resin or polycarbonate resin/ABS resin alloy. The present invention was achieved as a result.

The present invention relates to the polycarbonate resin composition and molded article described in the following.

[1] A polycarbonate resin composition comprising, per 100 mass parts of a polycarbonate resin (A), 0 to 40 mass parts of a graft copolymer (B) comprising an aromatic vinyl monomer component (b1), a vinyl cyanide monomer component (b2), and a diene rubber polymer component (b3); 10 to 30 mass parts of a phosphate ester compound (C); 0.001 to 1.0 mass parts of a phosphite antioxidant (D); and 0.00001 to 0.1 mass parts of 2,4-di-tert-butylphenol (E).

[2] The polycarbonate resin composition according to [1], comprising, per 100 mass parts of the polycarbonate resin (A), 10 to 40 mass parts of the graft copolymer (B) Comprising the aromatic vinyl monomer component (b1), the vinyl cyanide monomer component (b2), and the diene rubber polymer component (b3), and 15 to 30 mass parts of the phosphate ester compound (C).

[3] The polycarbonate resin composition according to [1], Comprising, per 100 mass parts of the polycarbonate resin (A), at least 0 mass parts and less than 10 mass parts of the graft copolymer (B) Comprising the aromatic vinyl monomer component (b1), the vinyl cyanide monomer component (b2), and the diene rubber polymer component (b3), and 10 to 25 mass parts of the phosphate ester compound (C).

[4] The polycarbonate resin composition according to any of [1] to [3], wherein the phosphite antioxidant (D) is tris(2,4-di-tert-butylphenyl) phosphite.

[5] The polycarbonate resin composition according to any of [1] to [4], further comprising 1 to 20 mass parts of a core/shell elastomer (F) per 100 mass parts of the polycarbonate resin (A).

[6] The polycarbonate resin composition according to any of [1] to [5], further comprising 1 to 10 mass parts of a talc (G) per 100 mass parts of the polycarbonate resin (A).

[7] The polycarbonate resin composition according to any of [1] to [6], further comprising 0.01 to 7 mass parts of a white pigment (H) per 100 mass parts of the polycarbonate resin (A).

[8] The polycarbonate resin composition according to [7], wherein the white pigment (H) is titanium oxide.

[9] The polycarbonate resin composition according to any of [1] to [8], wherein the total of the contents of the phosphite antioxidant (D) and the 2,4-di-tert-butylphenol (E) is 0.002 to 1 mass parts per 100 mass parts of the polycarbonate resin (A).

[10] The polycarbonate resin composition according to any of [1] to [9], wherein the mass ratio (E)/(D) between the 2,4-di-tert-butylphenol (E) and the phosphite antioxidant (D) is 0.001 to 1.

[11] A molded article provided by molding the polycarbonate resin composition according to any of [1] to [10].

Advantageous Effects of Invention

The polycarbonate resin composition according to the present invention exhibits an excellent flame retardancy and impact resistance; in addition has a heat stability at a level sufficiently high to withstand high-temperature molding; and also exhibits an excellent hue and moist heat resistance.

DESCRIPTION OF EMBODIMENTS

The present invention is described in detail in the following using embodiments and examples, but the present invention should not be construed as being limited to the embodiments and examples given in the following.

Unless specifically indicated otherwise, in this Description "to" in the specification of a numerical value range is used in the sense of including the numerical values before and after the "to" that are used as the lower limit and upper limit. In addition, and also unless specifically indicated otherwise, "parts" indicates mass parts based on a mass frame of reference.

The polycarbonate resin composition according to the present invention characteristically contains, per 100 mass parts of a polycarbonate resin (A), 0 to 40 mass parts of a graft copolymer (B) comprising (b1) an aromatic vinyl monomer component (b1), a vinyl cyanide monomer component (b2), and a diene rubber polymer component (b3); 10 to 30 mass parts of a phosphate ester compound (C); 0.001 to 1.0 mass parts of a phosphite antioxidant (D); and 0.00001 to 0.1 mass parts of 2,4-di-tert-butylphenol (E).

[Polycarbonate Resin (A)]

There are no limitations on the species of the polycarbonate resin (A) used in the polycarbonate resin composition according to the present invention, and only a single species of polycarbonate resin (A) may be used or two or more species may be used in any combination and any ratio.

The polycarbonate resin is a polymer with a basic structure that has the carbonate bond given by the formula—[—O—X—O—C(=O)—]—. X in the formula is generally a hydrocarbon, but an X incorporating a heteroatom or hetero bond may be used in order to impart various properties.

Polycarbonate resins can be classified into aromatic polycarbonate resins, in which each of the carbon atoms directly bonded to the carbonate bond is an aromatic carbon, and aliphatic polycarbonate resins, in which they are aliphatic carbon atoms, and either of these can be used. Aromatic polycarbonate resins are preferred therebetween considering, for example, the heat resistance, mechanical properties, and electrical properties.

There are no limitations on the specific species of polycarbonate resin, and examples here are polycarbonate polymers provided by the reaction of a dihydroxy compound with a carbonate precursor. A polyhydroxy compound and so forth may also be reacted here in addition to the dihydroxy compound and carbonate precursor. A method may also be used in which carbon dioxide is reacted as the carbonate precursor with a cyclic ether. The polycarbonate polymer may be a linear or branched chain. In addition, the polycarbonate polymer may be a homopolymer composed of a single species of repeat unit or may be a copolymer having two or more species of repeat units. Various copolymerization modes may be selected for such a copolymer, e.g., random copolymer, block copolymer, and so forth. A polycarbonate polymer as described here is generally a thermoplastic resin.

Among the monomers comprising the starting materials for aromatic polycarbonate resins, aromatic dihydroxy compounds can be exemplified by the following:

dihydroxybenzenes, e.g., 1,2-dihydroxybenzene, 1,3-dihydroxybenzene (i.e., resorcinol), and 1,4-dihydroxybenzene;

dihydroxybiphenyls, e.g., 2,5-dihydroxybiphenyl, 2,2'-dihydroxybiphenyl, and 4,4'-dihydroxybiphenyl;

dihydroxynaphthalenes, e.g., 2,2'-dihydroxy-1,1'-binaphthyl, 1,2-dihydroxynaphthalene, 1,3-dihydroxynaphthalene, 2,3-dihydroxynaphthalene, 1,6-dihydroxynaphthalene, 2,6-dihydroxynaphthalene, 1,7-dihydroxynaphthalene, and 2,7-dihydroxynaphthalene;

dihydroxydiaryl ethers such as 2,2'-dihydroxydiphenyl ether, 3,3'-dihydroxydiphenyl ether, 4,4'-dihydroxydiphenyl ether, 4,4'-dihydroxy-3,3'-dimethyldiphenyl ether, 1,4-bis(3-hydroxyphenoxy)benzene, and 1,3-bis(4-hydroxyphenoxy)benzene;

bis(hydroxyaryl)alkanes such as 2,2-bis(4-hydroxyphenyl)propane (i.e., bisphenol A), 1,1-bis(4-hydroxyphenyl)propane, 2,2-bis(3-methyl-4-hydroxyphenyl)propane, 2,2-bis(3-methoxy-4-hydroxyphenyl)propane, 2-(4-hydroxyphenyl)-2-(3-methoxy-4-hydroxyphenyl)propane, 1,1-bis(3-tert-butyl-4-hydroxyphenyl)propane, 2,2-bis(3,5-dimethyl-4-hydroxyphenyl)propane, 2,2-bis(3-cyclohexyl-4-hydroxyphenyl)propane, 2-(4-hydroxyphenyl)-2-(3-cyclohexyl-4-hydroxyphenyl)propane, α,α'-bis(4-hydroxyphenyl)-1,4-diisopropylbenzene, 1,3-bis[2-(4-hydroxyphenyl)-2-propyl]benzene, bis(4-hydroxyphenyl)methane, bis(4-hydroxyphenyl)cyclohexylmethane, bis(4- hydroxyphenyl)phenylmethane, bis(4-hydroxyphenyl)(4-propenylphenyl)methane, bis(4-hydroxyphenyl)diphenylmethane, bis(4-hydroxyphenyl)naphthylmethane, 1,1-bis(4-hydroxyphenyl) ethane, 1,1-bis(4-hydroxyphenyl)-1-phenylethane, 1,1-bis(4-hydroxyphenyl)-1-naphthylethane, 1,1-bis(4-hydroxyphenyl)butane, 2,2-bis(4-hydroxyphenyl)butane, 2,2-bis(4-hydroxyphenyl)pentane, 1,1-bis(4-hydroxyphenyl)hexane, 2,2-bis(4-hydroxyphenyl)hexane, 1,1-bis(4-hydroxyphenyl)octane, 2,2-bis(4-hydroxyphenyl)octane, 4,4-bis(4-hydroxyphenyl)heptane, 2,2-bis(4-hydroxyphenyl)nonane, 1,1-bis(4-hydroxyphenyl)decane, and 1,1-bis(4-hydroxyphenyl)dodecane;

bis(hydroxyaryl)cycloalkanes such as 1,1-bis(4-hydroxyphenyl)cyclopentane, 1,1-bis(4-hydroxyphenyl)cyclohexane, 1,1-bis(4-hydroxyphenyl)-3,3-dimethylcyclohexane, 1,1-bis(4-hydroxyphenyl)-3,4-dimethylcyclohexane, 1,1-bis(4-hydroxyphenyl)-3,5-dimethylcyclohexane, 1,1-bis(4-hydroxyphenyl)-3,3,5-trimethylcyclohexane, 1,1-bis(4-hydroxy-3,5-dimethylphenyl)-3,3,5-trimethylcyclohexane, 1,1-bis(4-hydroxyphenyl)-3-propyl-5-methylcyclohexane, 1,1-bis(4-hydroxyphenyl)-3-tert-butylcyclohexane, 1,1-bis(4-hydroxyphenyl)-4-tert-butylcyclohexane, 1,1-bis(4-hydroxyphenyl)-3-phenylcyclohexane, and 1,1-bis(4-hydroxyphenyl)-4-phenylcyclohexane;

cardo structure-containing bisphenols such as 9,9-bis(4-hydroxyphenyl)fluorene and 9,9-bis(4-hydroxy-3-methylphenyl)fluorene;

dihydroxydiaryl sulfides such as 4,4'-dihydroxydiphenyl sulfide and 4,4'-dihydroxy-3,3'-dimethyldiphenyl sulfide;

dihydroxydiaryl sulfoxides such as 4,4'-dihydroxydiphenyl sulfoxide and 4,4'-dihydroxy-3,3'-dimethyldiphenyl sulfoxide; and dihydroxydiaryl sulfones such as 4,4'-dihydroxydiphenyl sulfone and 4,4'-dihydroxy-3,3'-dimethyldiphenyl sulfone.

Among the preceding, the bis(hydroxyaryl)alkanes are preferred and among them the bis(4-hydroxyphenyl)alkanes are preferred, while 2,2-bis(4-hydroxyphenyl)propane (i.e., bisphenol A) is particularly preferred from the standpoints of the impact resistance and heat resistance.

A single aromatic dihydroxy compound may be used or any combination of two or more in any proportions may be used.

The monomers comprising the starting materials for aliphatic polycarbonate resins can be exemplified by the following:

alkanediols such as ethane-1,2-diol, propane-1,2-diol, propane-1,3-diol, 2,2-dimethylpropane-1,3-diol, 2-methyl-2-propylpropane-1,3-diol, butane-1,4-diol, pentane-1,5-diol, hexane-1,6-diol, and decane-1,10-diol;

cycloalkanediols such as cyclopentane-1,2-diol, cyclohexane-1,2-diol, cyclohexane-1,4-diol, 1,4-cyclohexanedimethanol, 4-(2-hydroxyethyl)cyclohexanol, and 2,2,4,4-tetramethylcyclobutane-1,3-diol;

glycols such as ethylene glycol, 2,2'-oxydiethanol (i.e., diethylene glycol), triethylene glycol, propylene glycol, and spiroglycol;

aralkyl diols such as 1,2-benzenedimethanol, 1,3-benzenedimethanol, 1,4-benzenedimethanol, 1,4-benzenediethanol, 1,3-bis(2-hydroxyethoxy)benzene, 1,4-bis(2-hydroxyethoxy)benzene, 2,3-bis(hydroxymethyl)naphthalene, 1,6-bis(hydroxyethoxy)naphthalene, 4,4'-biphenyldimethanol, 4,4'-biphenyldiethanol, 1,4-bis(2-hydroxyethoxy)biphenyl, bisphenol A bis(2-hydroxyethyl) ether, and bisphenol S bis(2-hydroxyethyl) ether; and cyclic ethers such as 1,2-epoxyethane (i.e., ethylene oxide), 1,2-epoxypropane (i.e., propylene oxide), 1,2-epoxycyclopentane, 1,2-epoxycyclohexane, 1,4-epoxycyclohexane, 1-methyl-1,2-epoxycyclohexane, 2,3-epoxynorbornane, and 1,3-epoxypropane.

Of the monomers comprising the starting materials for polycarbonate resins, the carbonate precursor can be exemplified by carbonyl halides and carbonate esters. A single carbonate precursor may be used or any combination of two or more in any proportions may be used.

The carbonyl halides can be specifically exemplified by phosgene and by haloformates such as the bischloroformates of dihydroxy compounds and the monochloroformates of dihydroxy compounds.

The carbonate esters can be specifically exemplified by diaryl carbonates such as diphenyl carbonate and ditolyl carbonate; dialkyl carbonates such as dimethyl carbonate and diethyl carbonate; and carbonates of dihydroxy compounds, e.g., biscarbonates of dihydroxy compounds, monocarbonates of dihydroxy compounds, and cyclic carbonates.

There are no particular limitations on the method of producing the polycarbonate resin, and any method can be used. Examples thereof are the interfacial polymerization method, melt transesterification method, pyridine method, ring-opening polymerization of a cyclic carbonate compound, and solid-state transesterification of a prepolymer.

Additional Considerations for Polycarbonate Resin (A)

The molecular weight of the polycarbonate resin (A) may be freely selected and may be determined by selection as appropriate; however, the viscosity-average molecular weight [Mv], which is derived from the solution viscosity, is generally at least 10,000 and is preferably at least 14,000 and more preferably at least 15,000 and is generally not more than 40,000 and is preferably not more than 33,000 and more preferably not more than 30,000. By having the viscosity-average molecular weight be at least as large as the lower limit on the indicated range, the mechanical strength of the polycarbonate resin composition according to the present invention can be further improved, which is more preferred in the case of use in applications where there are strong requirements for mechanical strength. On the other hand, by having the viscosity-average molecular weight be not more than the upper limit on the indicated range, reductions in the flowability of the polycarbonate resin composition according to the present invention can be suppressed and ameliorated and the molding processability can be enhanced and the molding process can be easily carried out.

It should be noted that a mixture of two or more polycarbonate resins having different viscosity-average molecular weights may be used for the polycarbonate resin (A), in which case a polycarbonate resin having a viscosity-average molecular weight outside the aforementioned preferred range may be admixed.

It should be noted that the viscosity-average molecular weight DM refers to the value calculated using Schnell's viscosity equation, i.e., $\eta=1.23\times10^{-4}\ Mv^{0.83}$, wherein the intrinsic viscosity [η] (unit: dl/g) refers to determined at a temperature of 20° C. using methylene chloride as the solvent and using a Ubbelohde viscometer. The intrinsic viscosity [η] is the value calculated using the following formula and the specific viscosity [$\eta_{sp}$] measured at each solution concentration [C] (g/dl).

$$\eta = \lim_{c \to 0} \eta_{sp}/c. \qquad \text{[Math. 1]}$$

The concentration of the terminal hydroxyl groups in the polycarbonate resin (A) may be freely selected and may be determined by selection as appropriate, but will generally be not more than 1,000 ppm and is preferably not more than 800 ppm and more preferably not more than 600 ppm. This makes it possible to bring about additional improvements in the residence heat stability and hue of the polycarbonate resin composition according to the present invention. In addition, the lower limit here, particularly for polycarbonate resin produced by the melt transesterification method, is generally at least 10 ppm and is preferably at least 30 ppm and more preferably at least 40 ppm. This makes it possible to suppress reductions in the molecular weight and to bring about additional improvements in the mechanical properties of the polycarbonate resin composition according to the present invention.

The unit for the terminal hydroxyl group concentration is the mass of the terminal hydroxyl groups expressed as ppm with reference to the mass of the polycarbonate resin. The measurement method here is colorimetric determination by the titanium tetrachloride/acetic acid method (the method described in Macromol. Chem., 88 215 (1965)).

Polycarbonate resin alone ("polycarbonate resin alone" is not limited to aspects in which only a single species of polycarbonate resin is incorporated, but is used in the sense of including embodiments in which a plurality of polycarbonate resins having different monomer compositions and/or molecular weights from each other are incorporated) may be used for the polycarbonate resin (A), or the combination of polycarbonate resin with an alloy (mixture) with another thermoplastic resin may be used. Moreover, it may be structured as a copolymer in which polycarbonate resin is the major portion, for example, as a copolymer of a polycarbonate resin with a siloxane structure-containing oligomer or polymer, with the goal of raising the flame retardancy and impact resistance still further; as a copolymer of a polycarbonate resin with a phosphorus atom-containing monomer, oligomer, or polymer, with the goal of raising the thermal oxidation stability and flame retardancy still further; as a copolymer of a polycarbonate resin with a dihydroxyanthraquinone structure-containing monomer, oligomer, or polymer, with the goal of improving the thermal oxidation stability; as a copolymer of a polycarbonate resin with an oligomer or polymer having an olefinic structure, e.g., polystyrene, in order to improve the optical properties; or as a copolymer of a polycarbonate resin with a polyester resin oligomer or polymer with the goal of enhancing the chemical resistance.

In addition, the polycarbonate resin (A) may contain a polycarbonate oligomer in order to bring about an improved appearance for the molded article and improve the flowability. The viscosity-average molecular weight [Mv] of this polycarbonate oligomer is generally at least 1,500 and is preferably at least 2,000 and is generally not more than 9,500 and is preferably not more than 9,000. The incorporated polycarbonate oligomer is preferably not more than 30 mass parts of the polycarbonate resin (including the polycarbonate oligomer).

The polycarbonate resin (A) may be a virgin starting material, but may also be a polycarbonate resin that has been regenerated from post-consumer products (also known as material recycled polycarbonate resin). These post-consumer products can be exemplified by optical recording media such as optical disks; light guide plates; transparent vehicle components such as automotive window panes, automotive headlamp lenses, and windshields; containers such as water bottles; eyeglass lenses; and building components such as sound barriers, windows, and corrugated sheet. Also usable is the pulverizate from, e.g., product rejects, sprues, runners, and so forth, as well as the pellets obtained by melting same.

[Graft Copolymer (B) Comprising Aromatic Vinyl Monomer Component (b1), Vinyl Cyanide Monomer Component (b2), and Diene Rubber Polymer Component (b3)]

The graft copolymer (B) that may be incorporated in the polycarbonate resin composition according to the present invention is a graft copolymer comprising an aromatic vinyl monomer component (b1), a vinyl cyanide monomer component (b2), and a diene rubber polymer component (b3). The graft copolymer (B) preferably contains 40 to 80 mass % of the aromatic vinyl monomer component (b1), 10 to 30 mass % of the vinyl cyanide monomer component (b2), 10 to 50 mass % of the diene rubber polymer component (b3), and 0 to 30 mass % of another monomer component (b4).

The aromatic vinyl monomer component (b1) in the graft copolymer (B) can be exemplified by styrene, α-methylstyrene, o-methylstyrene, p-methylstyrene, vinylxylene, ethylstyrene, dimethylstyrene, p-tert-butylstyrene, vinylnaphthalene, methoxystyrene, monobromostyrene, dibromostyrene, fluorostyrene, and tribromostyrene, wherein styrene is particularly preferred.

The proportion of the aromatic vinyl monomer component (b1) in the graft copolymer (B), in 100 mass % for the graft copolymer (B), is preferably in the range from 40 to 80 mass % and is more preferably at least 45 mass %, still more preferably at least 50 mass %, and particularly preferably at least 55 mass % and is more preferably not more than 75 mass %, still more preferably not more than 70 mass %, and particularly preferably not more than 65 mass %.

The vinyl cyanide monomer component (b2) in the graft copolymer (B) can be exemplified by acrylonitrile and methacrylonitrile with acrylonitrile being particularly preferred.

The proportion of the vinyl cyanide monomer component (b2) in the graft copolymer (B), in 100 mass % for the graft copolymer (B), is preferably in the range from 10 to 30 mass % and is more preferably at least 12 mass %, still more preferably at least 14 mass %, and particularly preferably at least 15 mass % and is more preferably not more than 28 mass %, still more preferably not more than 26 mass %, and particularly preferably not more than 25 mass %.

A rubber component, for example, polybutadiene, polyisoprene, styrene-butadiene copolymer, and so forth, is used for the diene rubber polymer component (b3) of the graft copolymer (B), and the proportion of the diene rubber polymer component (b3) in the graft copolymer (B), in 100 mass % for the graft copolymer (B), is preferably in the range from 10 to 50 mass % and is more preferably at least 13 mass %, still more preferably at least 14 mass %, and particularly preferably at least 15 mass % and is more preferably not more than 45 mass %.

These may be copolymerized with an additional copolymerizable monomer component (b4), and an additional copolymerizable vinyl monomer in this case can be exemplified by maleimide monomers such as maleimide, N-methylmaleimide, N-cyclohexylmaleimide, and N-phenylmaleimide; acrylamide monomers such as acrylamide and N-methylacrylamide; unsaturated acid anhydrides such as maleic anhydride and itaconic anhydride; unsaturated acids such as acrylic acid and methacrylic acid; and glycidyl acrylate, glycidyl methacrylate, 2-hydroxyethyl acrylate, 2-hydroxyethyl methacrylate, and methoxypolyethylene glycol methacrylate.

The proportion of the additional monomer component (b4) in the graft copolymer (B), in 100 mass % for the graft copolymer (B), is preferably in the range from 0 to 30 mass % and is more preferably not more than 20 mass % and still more preferably not more than 10 mass %.

Preferred specific examples of the graft copolymer (B) are acrylonitrile-butadiene-styrene copolymer, acrylonitrile-butadiene-styrene-α-methylstyrene copolymer, and acrylonitrile-butadiene-styrene-N-phenylmaleimide copolymer.

The graft copolymer (B) is in general produced by methods such as bulk polymerization, solution polymerization, suspension polymerization, emulsion polymerization, and so forth, and graft copolymer (B) produced by any method may be used.

The content of the graft copolymer (B) is 0 to 40 mass parts per 100 mass parts of the polycarbonate resin (A).

In a first aspect, the preferred content of the graft copolymer (B), per 100 mass parts of the polycarbonate resin (A), is 10 to 40 mass parts and is more preferably at least 12 mass parts, still more preferably at least 15 mass parts, and particularly preferably at least 18 mass parts; preferably not more than 35 mass parts, still more preferably not more than 30 mass parts, and particularly preferably not more than 27 mass parts; and more preferably 12 to 35 mass parts, still more preferably 15 to 30 mass parts, and particularly preferably 18 to 27 mass parts.

In a second aspect, in which the graft copolymer (B) is either not incorporated or is incorporated in a small amount, the content of the graft copolymer (B), per 100 mass parts of the polycarbonate resin (A), is preferably either 0 mass parts or more than 0 mass parts but less than 10 mass parts and is more preferably at least 0 mass parts and less than 8 mass parts and is still more preferably at least 0 mass parts and less than 6.5 mass parts.

[Phosphate Ester Compound (C)]

The polycarbonate resin composition according to the present invention contains a phosphate ester compound (C) as a flame retardant. The phosphate ester compound (C) may be a small molecule or an oligomer or a polymer, but from the standpoint of the heat stability is particularly preferably a phosphate ester compound as represented by general formula (1).

[C1]

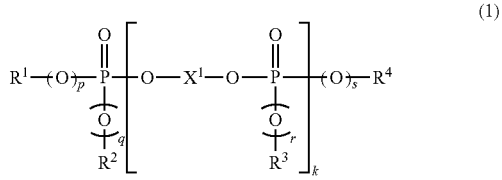

(1)

(In formula (1), $R^1$, $R^2$, $R^2$, and $R^4$ each represent an alkyl group having 1 to 6 carbons or an aryl group having 6 to 20 carbons and possibly substituted by an alkyl group; p, q, r, and s are each 0 or 1; k is an integer from 0 to 5; and $X^1$ represents an arylene group.)

The phosphate ester compound represented by formula (1) may be a mixture of compounds in which k has different values, and k is then the average value for the mixture in the case of a mixture of condensed phosphate esters in which this k is different. k is generally an integer from 0 to 5 and, in the case of a mixture of compounds having different values of k, the average value of k is preferably 0.5 to 2, more preferably 0.6 to 1.5, still more preferably 0.8 to 1.2, and particularly preferably 0.95 to 1.15.

In addition, $X^1$ represents a divalent arylene group, for example, a divalent group derived from a dihydroxy compound such as resorcinol, hydroquinone, bisphenol A, 2,2'-dihydroxybiphenyl, 2,3'-dihydroxybiphenyl, 2,4'-dihydroxybiphenyl, 3,3'-dihydroxybiphenyl, 3,4'-dihydroxybiphenyl, 4,4'-dihydroxybiphenyl, 1,2-dihydroxynaphthalene, 1,3-dihydroxynaphthalene, 1,4-dihydroxynaphthalene, 1,5-dihydroxynaphthalene, 1,6-dihydroxynaphthalene, 1,7-dihydroxynaphthalene, 1,8-dihydroxynaphthalene, 2,3-dihydroxynaphthalene, 2,6-dihydroxynaphthalene, and 2,7-dihydroxynaphthalene. Among the preceding, a divalent group derived from resorcinol, bisphenol A, or 3,3'-dihydroxybiphenyl is particularly preferred.

p, q, r, and s in formula (1) each represent 0 or 1 with 1 being preferred therebetween.

$R^1$, $R^2$, $R^3$, and $R^4$ each represent an alkyl group having 1 to 6 carbons or an aryl group having 6 to 20 carbons and possibly substituted by an alkyl group. This aryl group can be exemplified by phenyl group, cresyl group, xylyl group, isopropylphenyl group, butylphenyl group, tert-butylphenyl group, di-tert-butylphenyl group, p-cumylphenyl group, and so forth, with the phenyl group, cresyl group, and xylyl group being more preferred.

Phosphate ester compounds represented by formula (1) can be specifically exemplified by the following:

aromatic phosphate esters such as triphenyl phosphate (TPP), tricresyl phosphate (TCP), trixylenyl phosphate (TXP), cresyl diphenyl phosphate (CDP), 2-ethylhexyl diphenyl phosphate (EHDP), tert-butylphenyl diphenyl phosphate, bis(tert-butylphenyl) phenyl phosphate, tris(tert-butylphenyl) phosphate, isopropylphenyl diphenyl phosphate, bis(isopropylphenyl) diphenyl phosphate, and tris(isopropylphenyl) phosphate; and condensed phosphate esters such as resorcinol bis(diphenyl phosphate) (RDP), resorcinol bis(dixylenyl phosphate) (RDX), bisphenol A bis(diphenyl phosphate) (BDP), and biphenyl bis(diphenyl phosphate).

The acid value of the phosphate ester compound represented by formula (1) is preferably not more than 0.2 mgKOH/g, more preferably not more than 0.15 mgKOH/g, still more preferably not more than 0.1 mgKOH/g, and particularly preferably not more than 0.05 mgKOH/g. The lower limit for this acid value may be substantially 0. The content of the half ester, on the other hand, is more preferably not more than 1.1 mass parts and is even more preferably not more than 0.9 mass parts. A reduction in the heat stability and/or hydrolysis resistance of the polycarbonate resin composition according to the present invention readily results when the acid value exceeds 0.2 mgKOH/g and/or when the half ester content exceeds 1.5 mass parts.

The content of the phosphate ester compound (C), per 100 mass parts of the polycarbonate resin (A), is 10 to 30 mass parts and is preferably at least 11 mass parts and more preferably at least 12 mass parts; more preferably not more than 28 mass parts and still more preferably not more than 25 mass parts; and preferably 11 to 30 mass parts, more preferably 12 to 30 mass parts, particularly preferably 15 to 30 mass parts, and most preferably 15 to 28 mass parts. The flame retardancy is inadequate when the content of the phosphate ester compound (C) is less than 10 mass parts, while exceeding 30 mass parts readily causes a substantial reduction in the heat resistance and/or a reduction in the mechanical properties.

[Phosphite Antioxidant (D)]

The polycarbonate resin composition according to the present invention contains a phosphite antioxidant (D). The phosphite compound is a trivalent phosphorus compound represented by the general formula $P(OR)_3$ wherein R is a monovalent or divalent organic group.

This phosphite compound is exemplified by triphenyl phosphite, tris(monononylphenyl) phosphite, tris(monononyl/dinonyl-phenyl) phosphite, tris(2,4-di-tert-butylphenyl) phosphite, monooctyl diphenyl phosphite, dioctyl monophenyl phosphite, monodecyl diphenyl phosphite, didecyl monophenyl phosphite, tridecyl phosphite, trilauryl phosphite, tristearyl phosphite, distearyl pentaerythritol diphosphite, bis(2,4-di-tert-butyl-4-methylphenyl) pentaerythritol phosphite, bis(2,6-di-tert-butylphenyl) octyl phosphite, 2,2-methylenebis(4,6-di-tert-butylphenyl) octyl phosphite, tetrakis(2,4-di-tert-butylphenyl)-4,4'-biphenylene diphosphite, and 6-[3-(3-tert-butyl-hydroxy-5-methylphenyl)propoxy]-2,4,8,10-tetra-tert-butyldibenzo[d,f][1,3,2]dioxaphosphepine.

Among these phosphite compounds, the aromatic phosphite compounds represented by the following formulas (2) and (3) are preferred because they can effectively bring about a greater increase in the resistance to thermal discoloration exhibited by the polycarbonate resin composition according to the present invention.

[C2]

(2)

(In the formula, $R^1$, $R^2$, and $R^3$ each independently represent an aryl group having 6 to 30 carbons.)

[C3]

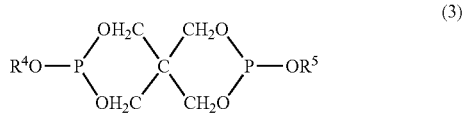
(3)

(In the formula, $R^4$ and $R^5$ each independently represent an aryl group having 6 to 30 carbons.)

Among the phosphite compounds represented by formula (2), triphenyl phosphite, tris(monononylphenyl) phosphite, tris(2,4-di-tert-butylphenyl) phosphite, and so forth are preferred whereamong tris(2,4-di-tert-butylphenyl) phosphite is more preferred. These organophosphite compounds can be specifically exemplified by "ADK STAB 1178" from the ADEKA Corporation, "Sumilizer TNP" from Sumitomo Chemical Co., Ltd., "JP-351" from Johoku Chemical Co., Ltd., "ADK STAB 2112" from the ADEKA Corporation, "Irgafos 168" from BASF, and "JP-650" from Johoku Chemical Co., Ltd.

Among the phosphite compounds represented by formula (3), those having a pentaerythritol diphosphite structure, such as bis(2,4-di-tert-butyl-4-methylphenyl) pentaerythritol diphosphite, bis(2,6-di-tert-butyl-4-methylphenyl) pentaerythritol diphosphite, and bis(2,4-dicumylphenyl) pentaerythritol diphosphite, are particularly preferred. Specific preferred examples of these organophosphite compounds are "ADK STAB PEP-24G" and "ADK STAB PEP-36" from the ADEKA Corporation and "Doverphos S-9228" from Dover Chemical Corporation.

A single phosphite antioxidant (D) may be incorporated or two or more may be incorporated in any combination and any ratio.

The content of the phosphite antioxidant (D), per 100 mass parts of the polycarbonate resin (A), is 0.001 to 1.0 mass parts and preferably at least 0.002 mass parts and more preferably at least 0.003 mass parts, and is preferably not more than 0.8 mass parts, more preferably not more than 0.65 mass parts, and still more preferably not more than 0.5 mass parts. The hue and moist heat resistance are unsatisfactory when the content of the phosphite antioxidant (D) is less than 0.001 mass parts. At above 1.0 mass parts, the impact resistance and moist heat resistance readily deteriorate instead.

[2,4-Di-tert-butylphenol (E)]

The polycarbonate resin composition according to the present invention contains 2,4-di-tert-butylphenol (E).

The content of the 2,4-di-tert-butylphenol (E), per 100 mass parts of the polycarbonate resin (A), is 0.00001 to 0.1 mass parts and is preferably at least 0.00005 mass parts, more preferably at least 0.0001 mass parts, even more preferably at least 0.0002 mass parts, particularly preferably at least 0.0003 mass parts, and still more preferably at least 0.0004 mass parts; preferably not more than 0.09 mass parts, more preferably not more than 0.08 mass parts, and even more preferably not more than 0.07 mass parts; and preferably 0.0002 to 0.09 mass parts, more preferably 0.0003 to 0.08 mass parts, and even more preferably 0.0003 to 0.07 mass parts. The hue and moist heat resistance are unsatisfactory when the content of the 2,4-di-tert-butylphenol (E) is less than 0.00001 mass parts, while the impact resistance and/or moist heat resistance readily deteriorate at above 0.1 mass parts.

The total of the contents of the phosphite antioxidant (D) and the 2,4-di-tert-butylphenol (E), per 100 mass parts of the polycarbonate resin (A), is preferably 0.002 to 1 mass parts and is more preferably at least 0.003 mass parts and even more preferably at least 0.005 mass parts; more preferably not more than 0.9 mass parts and even more preferably not more than 0.8 mass parts; and preferably 0.003 to 0.9 mass parts and more preferably 0.005 to 0.8 mass parts.

The mass ratio (E)/(D) between the content of the 2,4-di-tert-butylphenol (E) and the content of the phosphite antioxidant (D) is preferably 0.001 to 1, more preferably 0.005 to 0.8, still more preferably 0.01 to 0.5, and particularly preferably 0.02 to 0.5.

[Core/Shell Elastomer (F)]

The polycarbonate resin composition according to the present invention contains a core/shell elastomer (F).

The core/shell elastomer is preferably a core/shell graft copolymer type. An example in this regard is a core/shell graft copolymer in which the core layer is at least one rubber component selected from diene rubbers such as polybutadiene, polybutyl acrylate rubbers, polyorganosiloxane rubbers, and IPN composite rubbers composed of polyorganosiloxane rubber and polyalkyl acrylate rubber, and in which the shell layer is formed by the copolymerization of a (meth)acrylate ester on the circumference of the core layer.

Among the preceding, the use is preferred of a graft copolymer elastomer in which the core layer is a diene rubber polymer and the shell layer is provided by the graft copolymerization thereon of a (meth)acrylate ester compound. The method for producing the graft copolymer may be any production method, e.g., bulk polymerization, solution polymerization, suspension polymerization, emulsion polymerization, and so forth.

The diene rubber of the core layer can be exemplified by butadiene rubbers, e.g., polybutadiene, (partially) hydrogenated polybutadiene, and copolymers between butadiene and at least one vinyl monomer copolymerizable with butadiene, e.g., butadiene-styrene copolymers, (partially) hydrogenated polybutadiene-styrene copolymers, butadiene-styrene block copolymers, (partially) hydrogenated polybutadiene-styrene block copolymers, butadiene-acrylonitrile copolymers, and acrylic rubber copolymers in which butadiene-isobutyl acrylate is the main component, and by isobutylene rubbers such as polyisobutylene, polyisobutylene-styrene copolymers, and polyisobutylene-styrene block copolymers. Butadiene rubbers are preferred among the preceding.

In particular, butadiene-styrene copolymers, butadiene-styrene block copolymers, and polybutadienes provided by the copolymerization of 95 to 100 mass % 1,3-butadiene with 0 to 5 mass % of at least one vinyl monomer copolymerizable with 1,3-butadiene are more preferred for the butadiene rubber, with polybutadiene from substantially 100 mass % 1,3-butadiene being particularly preferred. While substantially 100 mass % polybutadiene indicates a rubber composed of only butadiene, trace amounts of other components may be incorporated for the purpose of raising the heat stability of the rubbery polymer and/or facilitating control of the particle diameter. In such a case, however, the other components are generally not more than 5 mass % in the butadiene rubber and are preferably not more than 3 mass % and more preferably not more than 1 mass %.

The (meth)acrylate ester compound that is graft polymerized on the diene rubber can be exemplified by the following: alkyl methacrylate esters such as methyl methacrylate, ethyl methacrylate, and n-butyl acrylate;

aryl methacrylates such as phenyl methacrylate and naphthyl methacrylate; and glycidyl group-containing methacrylates such as glycidyl acrylate and glycidyl methacrylate. From the standpoint of the balance between the heat resistance and the polycarbonate resin, alkyl methacrylate esters are preferred among the preceding and methyl methacrylate is more preferred.

A single one of these (meth)acrylate ester compounds may be used or two or more may be used.

As desired, vinyl monomer other than the aforementioned (meth)acrylate ester compounds may also be incorporated. This other vinyl monomer can be exemplified by the following:

aromatic vinyls such as styrene and α-methylstyrene;

unsaturated nitriles such as acrylonitrile and methacrylonitrile;

vinyl ethers such as methyl vinyl ether and butyl vinyl ether;

maleimide compounds such as maleimide, N-methylmaleimide, and N-phenylmaleimide; and α,β-unsaturated carboxylic acid compounds, e.g., maleic acid, phthalic acid, and itaconic acid, and their anhydrides (for example, maleic anhydride).

In addition, a crosslinking monomer may also be co-used, e.g., an aromatic multifunctional vinyl compound such as divinylbenzene and divinyltoluene;

an unsaturated carboxylic acid ester of a polyhydric alcohol, e.g., ethylene glycol dimethacrylate, 1,3-butanediol diacrylate, trimethylolethane triacrylate, trimethylolpropane trimethacrylate, and pentaerythritol tetramethacrylate;

allyl esters of unsaturated carboxylic acids, e.g., allyl acrylate and allyl methacrylate; and diallyl compounds and triallyl compounds such as diallyl phthalate, diallyl sebacate, and triallyltriazine.

The content of the diene rubber in such a preferred core/shell elastomer, in 100 mass % used for the total of the diene rubber, (meth)acrylate ester compound, other monomer, and crosslinking monomer, is preferably 50 to 95 mass %, more preferably 70 to 90 mass %, and still more preferably 75 to 85 mass %.

The (meth)acrylate ester compound that is graft polymerized to the diene rubber, in 100 mass % used for the total of the (meth)acrylate ester compound, other monomer, and crosslinking monomer, is preferably 50 to 100 mass %, more preferably 75 to 100 mass %, and still more preferably 90 to 100 mass % and particularly preferably is substantially 100 mass %.

There are no particular limitations on the method for producing the graft copolymer in the core/shell elastomer, and the production method may be any of bulk polymerization, solution polymerization, suspension polymerization, emulsion polymerization, and so forth, and the copolymerization regime may be single-stage grafting or multistage grafting. However, viewed from the standpoints of the productivity and facilitating control of the particle diameter, emulsion polymerization is preferred and a multistage emulsion polymerization is more preferred. This multistage emulsion polymerization method can be exemplified by the polymerization method described in JP 2003-261629 A.

The average particle diameter of the core/shell elastomer (F) is preferably 160 to 240 nm. When the average particle diameter is below the indicated lower limit, the impact resistance of the polycarbonate resin composition according to the present invention is prone to be unsatisfactory; when the average particle diameter exceeds the indicated upper limit, the flame retardancy and fire protection behavior of the polycarbonate resin composition according to the present invention readily decline, the impact resistance with high-temperature molding also declines, and the initial color is also prone to deteriorate. The average particle diameter is more preferably 170 to 220 nm and is even more preferably 180 to 210 nm.

The average particle diameter is determined as the volume-average particle diameter D50 as measured by dynamic light scattering on the graft copolymer solution after completion of the polymerization. For example, a "Microtrac 9230UPA Particle Size Analyzer" from Nikkiso Co., Ltd. can be used for the measurement.

This core/shell elastomer can be exemplified by the following: "Paraloid (registered trademark, also applies to the following) EXL2602", "Paraloid EXL2603", "Paraloid EXL2655", "Paraloid EXL2311", "Paraloid EXL2313", "Paraloid EXL2315", "Paraloid KM330", "Paraloid KM336P", and "Paraloid KCZ201", all from Rohm and Haas Japan KK; "Metablen (registered trademark, also applies to the following) C-223A" "Metablen E-901", "Metablen E-875A", "Metablen S-2001", and "Metablen SRK-200", all from Mitsubishi Chemical Corporation; and "Kane Ace (registered trademark, also applies to the following) M511", "Kane Ace M711", "Kane Ace M600", "Kane Ace M400" "Kane Ace M580", and "Kane Ace MR-01", all from the Kaneka Corporation.

The content of the core/shell elastomer (F), per 100 mass parts of the polycarbonate resin (A), is preferably 1 to 20 mass parts and is more preferably at least 2 mass parts, still more preferably at least 3 mass parts, and particularly at least 4 mass parts; more preferably not more than 15 mass parts, still more preferably not more than 12 mass parts, and particularly not more than 10 mass parts; and more preferably 2 to 15 mass parts, still more preferably 3 to 12 mass parts, and most preferably 4 to 10 mass parts. The impact resistance of the polycarbonate resin composition according to the present invention is inadequate when the content of the core/shell elastomer (F) is lower than the lower limit for the indicated range, while a decline in the flame retardancy, impact resistance, hue, and moist heat resistance readily occurs when the content exceeds the upper limit for the indicated range.

[White Pigment (G)]

The polycarbonate resin composition according to the present invention also preferably contains a white pigment (G). The incorporation of this white pigment makes it possible to impart whiteness to the molded resin article. The white pigment can be exemplified by titanium oxide, ZnS, ZnO, and so forth, with titanium oxide being more preferred.

Among the commercially available titanium oxides, the use is preferred, from the standpoint of whiteness, of those that contain at least 80 mass % titanium oxide. Titanium oxide can be exemplified by titanium monoxide (TiO), titanium trioxide ($Ti_2O_3$), and titanium dioxide ($TiO_2$). Any of these may be used, but titanium dioxide is preferred. In addition the use is preferred of titanium oxide having the rutile crystal structure.

The average primary particle diameter of the white pigment is preferably not more than 1 μm and is more preferably in the range from 0.001 to 0.5 μm and is still more preferably in the range from 0.002 to 0.1 μm. A high-whiteness molded article can be produced by using this range for the average particle diameter of the white pigment and using the range given in the following for the amount of incorporation.

The content of the white pigment (G), per 100 mass parts of the polycarbonate resin (A), is preferably 0.01 to 7 mass parts and is more preferably at least 0.1 mass parts and still more preferably at least 0.2 mass parts and is more preferably not more than 6 mass parts and still more preferably not more than 5 mass parts.

Only a single species of white pigment may be incorporated or two or more species may be incorporated. When two or more species are incorporated, preferably the total content is in the range given above.

[Fluoropolymer]

The polycarbonate resin composition according to the present invention preferably contains a fluoropolymer.

The fluoropolymer can be exemplified by fluoroolefin resins. Fluoroolefin resins are generally polymers and copolymers that contain a fluoroethylene structure. Specific examples are difluoroethylene resins, tetrafluoroethylene resins, tetrafluoroethylene/hexafluoropropylene copolymer resins, tetrafluoroethylene/perfluoroalkyl vinyl ether copolymer resins, and so forth. Tetrafluoroethylene resins are preferred among the preceding. This fluoroethylene resin can be a fibrillatable fluoroethylene resin.

Fibrillatable fluoroethylene resins can be exemplified by "Teflon (registered trademark) 6J" and "Teflon (registered trademark) 640J" from Du Pont-Mitsui Fluorochemicals Co., Ltd., and "Polyflon F201L", "Polyflon F103", "Polyflon FA500B", and "Polyflon FA500H" from Daikin Industries, Ltd. Commercially available water-based dispersions of fluoroethylene resins can be exemplified by "Teflon (registered trademark) 31-JR" from Du Pont-Mitsui Fluorochemicals Co., Ltd. and "Fluon D-210C" from Daikin Industries, Ltd. A fluoroethylene polymer having a multilayer structure and provided by the polymerization of vinyl monomer may also be used, and such fluoroethylene polymers can be exemplified by polystyrene-fluoroethylene composites, polystyrene-acrylonitrile-fluoroethylene composites, polymethyl methacrylate-fluoroethylene composites, and polybutyl methacrylate-fluoroethylene composites and can be specifically exemplified by "Metablen A-3800" from Mitsubishi Chemical Corporation and "Blendex 449" from GE Specialty Chemicals, Inc. A single antidripping agent may be incorporated or any combination with any proportions of two or more may be incorporated.

The fluoropolymer in the present invention preferably has a standard specific gravity value of 2.15 to 2.22. It is undesirable for the standard specific gravity to be less than 2.15 because the appearance of the molded article then assumes a declining trend. It is undesirable for the standard specific gravity to exceed 2.22 because the dripping resistance then assumes a declining trend. The value of the standard specific gravity is preferably 2.155 to 2.215, more preferably 2.16 to 2.1, particularly preferably 2.16 to 2.20, and most preferably 2.165 to 2.19. The standard specific gravity (also referred to as SSG) is the value measured by water displacement using a sample molded in conformity with ASTM D 4895.

The average particle diameter of the fluoropolymer is not particularly limited, but is preferably 300 to 1,000 μm. An average particle diameter below 300 μm is undesirable because the dripping resistance of the polycarbonate resin composition may then decline. Above 1,000 μm is undesirable because the fluoropolymer then readily undergoes aggregation and appearance defects, e.g., white punctiform foreign material, may occur when the molded article is prepared. Based on these considerations, the average particle diameter of the fluoropolymer is more preferably 350 to 800 μm, still more preferably 380 to 750 μm, and particularly preferably 400 to 700 μm.

The content of the fluoropolymer, per 100 mass parts of the polycarbonate resin (A), is preferably 0.01 to 1 mass parts and is more preferably at least 0.03 mass parts, still more preferably at least 0.05 mass parts, and particularly preferably at least 0.1 mass parts and is more preferably not more than 0.8 mass parts and still more preferably not more than 0.7 mass parts. The flame retardant effect due to the antidripping agent becomes inadequate when the fluoropolymer content is less than 0.01 mass parts. A content above 1 mass parts facilitates reductions in the mechanical strength and the occurrence of appearance defects in the molded article provided by molding the polycarbonate resin composition.

[Mold-Release Agent]

The polycarbonate resin composition according to the present invention preferably contains a mold-release agent.

Preferred examples of the mold-release agent are aliphatic carboxylic acids, aliphatic carboxylic acid/alcohol esters, aliphatic hydrocarbon compounds having a number-average molecular weight of 200 to 15,000, and polysiloxane silicone oils.

The aliphatic carboxylic acids can be exemplified by saturated or unsaturated monobasic, dibasic, or tribasic aliphatic carboxylic acids. The aliphatic carboxylic acid here also encompasses alicyclic carboxylic acids. Among these, preferred aliphatic carboxylic acids are monobasic or dibasic carboxylic acids having 6 to 36 carbons, while saturated monobasic aliphatic carboxylic acids having 6 to 36 carbons are more preferred. Specific examples of these aliphatic carboxylic acids are palmitic acid, stearic acid, caproic acid, capric acid, lauric acid, arachidic acid, behenic acid, lignoceric acid, cerotic acid, melissic acid, tetratriacontanoic acid, montanic acid, adipic acid, and azelaic acid.

For example, the same aliphatic carboxylic acids as cited above can be used for the aliphatic carboxylic acid in the aliphatic carboxylic acid/alcohol ester. The alcohol, on the other hand, can be exemplified by saturated or unsaturated monohydric or polyhydric alcohols. These alcohols may have a substituent such as a fluorine atom, aryl group, and so forth. Among the preceding, monohydric or polyhydric saturated alcohols having not more than 30 carbons are preferred, while aliphatic saturated monohydric alcohols and aliphatic saturated polyhydric alcohols, in each case having not more than 30 carbons, are more preferred. Here, aliphatic is used as a term that also encompasses alicyclic compounds.

The alcohol under consideration can be specifically exemplified by the following: octanol, decanol, dodecanol, stearyl alcohol, behenyl alcohol, ethylene glycol, diethylene glycol, glycerol, pentaerythritol, 2,2-dihydroxyperfluoropropanol, neopentylene glycol, ditrimethylolpropane, and dipentaerythritol.

The ester may contain the aliphatic carboxylic acid and/or the alcohol as impurities. In addition, the ester may be a pure material or may be a mixture of a plurality of compounds. A single aliphatic carboxylic acid or any combination in any proportion of two or more may be used for the aliphatic carboxylic acid constituting one ester by bonding therein, and a single alcohol or any combination in any proportion of two or more may be used for the alcohol constituting one ester by bonding therein.

Specific examples of the aliphatic carboxylic acid/alcohol esters are beeswax (a mixture in which melissyl palmitate is the main component), stearyl stearate, behenyl behenate, stearyl behenate, glycerol monopalmitate, glycerol monostearate, glycerol distearate, glycerol tristearate, pentaerythritol monopalmitate, pentaerythritol monostearate, pentaerythritol distearate, pentaerythritol tristearate, and pentaerythritol tetrastearate.

The aliphatic hydrocarbon having a number-average molecular weight of 200 to 15,000 can be exemplified by liquid paraffins, paraffin waxes, microwaxes, polyethylene waxes, Fischer-Tropsch waxes, and α-olefin oligomers having 3 to 12 carbons. This aliphatic hydrocarbon also encompasses alicyclic hydrocarbons. This aliphatic hydrocarbon may be partially oxidized.

Among the preceding, paraffin waxes, polyethylene waxes, and partially oxidized polyethylene waxes are preferred, with paraffin waxes and polyethylene waxes being more preferred.

The number-average molecular weight of the aliphatic hydrocarbon is preferably not more than 5,000.

The aliphatic hydrocarbon may be a single substance; however, a mixture of aliphatic hydrocarbons having various constituent components and/or molecular weights may be used as long as the major component is in the range indicated above.

The polysiloxane silicone oil can be exemplified by dimethylsilicone oil, methylphenylsilicone oil, diphenylsilicone oil, fluoroalkylsilicone, and so forth.

A single mold-release agent as described above may be incorporated or any combination of two or more in any ratio may be incorporated.

The content of the mold-release agent, per 100 mass parts of the polycarbonate resin (A), is generally at least 0.001 mass parts and is preferably at least 0.01 mass parts and is generally not more than 2 mass parts and preferably not more than 1 mass parts. The mold-release effect may be unsatisfactory when the content of the mold-release agent is below the lower limit for the indicated range, while the hydrolysis resistance may be lowered and mold contamination during injection molding and so forth may be produced when the content of the mold-release agent exceeds the upper limit for the indicated range.

[Phenolic Compounds Other than 2,4-Di-tert-butylphenol (E)]

The polycarbonate resin composition according to the present invention may contain a phenolic compound other than the 2,4-di-tert-butylphenol (E).

Specific examples thereof are pentaerythritol tetrakis[3-(3,5-di-tert-butyl-4-hydroxyphenyl)propionate], octadecyl 3-(3,5-di-tert-butyl-4-hydroxyphenyl)propionate, thiodiethylenebis[3-(3,5-di-tert-butyl-4-hydroxyphenyl)propionate], N,N'-hexan-1,6-diylbis[3-(3,5-di-tert-butyl-4-hydroxyphenyl)propionamide], 2,4-dimethyl-6-(1-methylpentadecyl)phenol, diethyl [[3,5-bis(1,1-dimethylethyl)-4-hydroxyphenyl]methyl]phosphoate, 3,3',3'',5,5',5''-hexa-tert-butyl-α,α', α''-(mesitylen-2,4,6-triyl)tri-p-cresol, 4,6-bis(octylthiomethyl)-o-cresol, ethylenebis(oxyethylene)bis[3-(5-tert-butyl-4-hydroxy-m-tolyl)propionate], hexamethylenebis[3-(3,5-di-tert-butyl-4-hydroxyphenyl)propionate], 1,3,5-tris(3,5-di-tert-butyl-4-hydroxybenzyl)-1,3,5-triazine-2,4,6(1H,3H,5H)-trione, 2,6-di-tert-butyl-4-(4,6-bis(octylthio)-1,3,5-triazin-2-ylamino)phenol, 2-[1-(2-hydroxy-3,5-di-tert-pentylphenyl)ethyl]-4,6-di-tert-pentylphenyl acrylate, 2,6-di-tert-butyl-p-cresol, and 2,4-bis (α,α-dimethylbenzyl)phenol.

When a phenolic compound other than 2,4-di-tert-butylphenol (E) is incorporated, the content thereof, per 100 mass parts of the polycarbonate resin (A), is preferably not more than 1 mass parts, more preferably not more than 0.5 mass parts, and particularly preferably not more than 0.3 mass parts.

[Other Components]

The polycarbonate resin composition according to the present invention may also optionally contain, insofar as its desired properties are not significantly impaired, resins other than those described above, additives other than those described above, and so forth.

These other resins may be exemplified by thermoplastic polyester resins, e.g., polyethylene terephthalate resins, polytrimethylene terephthalate, and polybutylene terephthalate resins; styrenic resins such as polystyrene resins, high-impact polystyrene resins (HIPS), acrylonitrile-styrene copolymers (AS resins), acrylonitrile-styrene-acrylic rubber copolymers (ASA resins), and acrylonitrile-ethylene-propylene rubber-styrene copolymers (AES resins); polyolefin resins such as polyethylene resins and polypropylene resins; polyamide resins; polyimide resins; polyetherimide resins; polyurethane resins; polyphenylene ether resins; polyphenylene sulfide resins; and polysulfone resins.

A single additional resin may be incorporated or two or more may be incorporated in any combination and any ratio.

When an additional resin is incorporated, its content, per 100 mass parts of the polycarbonate resin (A), is preferably not more than 20 mass parts, more preferably not more than 10 mass parts, even more preferably not more than 5 mass parts, and particularly preferably not more than 3 mass parts.

The resin additives can be exemplified by ultraviolet absorbers, colorants, static inhibitors, antifogging agents, anti-blocking agents, fluidity improvers, plasticizers, dispersing agents, and antiseptics. A single one of these resin additives may be incorporated or any combination of two or more at any ratio may be incorporated.

[Molded Article]

The polycarbonate resin composition according to the present invention is generally used in the form of a molded article provided by molding into a freely selected shape. There are no limitations on the shape, pattern, color, dimensions, and so forth of this molded article, and these may be freely established in conformity with the application for the molded article.

Examples of the molded article are as follows: components and parts for electrical and electronic equipment and devices, office automation equipment, information terminal equipment, machine parts, household electrical appliances and consumer electronics, vehicle components, building members, various containers, lighting equipment, and so forth. Among the preceding, use for the housings and enclosures of electrical and electronic equipment and devices and office automation equipment and particularly for the housings and enclosures of printers, copiers, projectors, modems, routers, and so forth, is particularly advantageous.

Any of the molding methods commonly used with polycarbonate resin compositions can be adopted as the method for producing the molded article. Examples here are injection molding methods, ultrahigh speed injection molding methods, injection compression molding methods, two-color molding methods, hollow molding methods such as gas-assisted molding, molding methods using insulated molds, molding methods using rapidly heated molds, foam molding (also including supercritical fluids), insert molding, IMC (in-mold coating molding) molding methods, extrusion molding methods, sheet molding methods, thermoforming methods, rotational molding methods, laminate molding methods, press molding methods, blow molding methods, and so forth. Molding methods that use a hot runner system may also be used.

Among the preceding, injection molding methods, e.g., injection molding methods, ultrahigh speed injection molding methods, and injection compression molding methods, are preferred.

The polycarbonate resin composition according to the present invention exhibits an excellent heat stability even under high-temperature molding conditions. The polycarbonate resin composition according to the present invention, when it contains 10 to 40 mass parts of the graft copolymer (B) per 100 mass parts of the polycarbonate resin (A), exhibits an excellent heat stability even under high-temperature molding conditions such as a resin temperature at and above 260° C., which as a consequence makes possible the execution of injection molding at resin temperatures at and above 265° C. and particularly at and above 270° C. The upper limit on this resin temperature is preferably about 280° C. The polycarbonate resin composition according to the present invention, when it contains 0 to 10 mass parts of the graft copolymer (B) per 100 mass parts of the polycarbonate resin (A), exhibits an excellent heat stability even under high-temperature molding conditions such as a resin temperature at and above 290° C., which as a consequence makes possible the execution of injection molding at resin temperatures at and above 290° C. and particularly at and above 300° C. The upper limit on this resin temperature is preferably about 320° C.

EXAMPLES

The present invention is more specifically described in the following using examples. However, the present invention is not limited to or by the examples given in the following and can be executed using any modification or alteration within a range in which there is no departure from the essential features of the present invention.

The various components used in the examples and comparative examples are as indicated in Table 1.

TABLE 1

| Component | Signal | |
|---|---|---|
| polycarbonate resin (A) | A1 | aromatic polycarbonate resin produced by interfacial polymerization using bisphenol A as a starting material viscosity-average molecular weight: 27,000 |
| | A2 | aromatic polycarbonate resin produced by interfacial polymerization using bisphenol A as a starting material viscosity-average molecular weight: 22,000 |
| | A3 | aromatic polycarbonate resin produced by interfacial polymerization using bisphenol A as a starting material viscosity-average molecular weight: 16,000 |
| ABS resin (B) | B1 | ABS resin of 59 mass % styrene, 18 mass % acrylonitrile, and 23 mass % butadiene rubber, produced by emulsion polymerization product name: Kralastic SXH-330, Nippon A & L Inc. |
| | B2 | ABS resin of 63 mass % styrene, 19 mass % acrylonitrile, and 18 mass % butadiene rubber, produced by bulk polymerization product name: Santac AT-08, Nippon A & L Inc. |
| | B3 | ABS resin with a butadiene rubber content of 40 mass %, produced by emulsion polymerization product name: Techno ABS DP-611, Techno Polymer Co., Ltd. |
| phosphate ester (C) | C | phenol condensate on 2,2-bis(p-hydroxyphenyl)propane-trichlorophosphine oxide polycondensate (degree of polymerization = 1 to 3) product name: FP-600, ADEKA Corporation |
| phosphite antioxidant (D) | D | tris(2,4-di-tert-butylphenyl) phosphite product name: ADK STAB 2112, ADEKA Corporation |
| di-t-butylphenol (E) | E | 2,4-di-tert-butylphenol Tokyo Chemical Industry Co., Ltd. |
| core/shell elastomer (F) | F1 | core/shell elastomer having butadiene rubber for the core and methyl methacrylate as the major component of the shell product name: Metablen E-875A, Mitsubishi Rayon Co., Ltd. |
| | F2 | core/shell elastomer having butadiene rubber for the core and methyl methacrylate as the major component of the shell product name: Kane Ace M711, Kaneka Corporation |
| talc (G) | G | product name: KHP25B, Hayashi Kasei Co., Ltd. |
| white pigment (H) | H | titanium oxide product name: 2233, KRONOS Worldwide, Inc. |
| fluoropolymer | I | fibrillatable fluoropolymer product name: FA-500H, Daikin Industries, Ltd. |
| mold-release agent | J | stearyl stearate product name: M9676, NOF Corporation |
| phenolic compound other than (E) | K1 | 2,6-di-tert-butyl-p-cresol Tokyo Chemical Industry Co., Ltd. |
| | K2 | 2,4-bis(α,α-dimethylbenzyl)phenol Tokyo Chemical Industry Co., Ltd. |

Examples 1 to 20 and Comparative Examples 1 to 11

[Resin Pellet Production]

The components indicated in Table 1, except for component C, were blended in the proportions (given in mass parts in all instances) given in Tables 2 to 6 and were mixed for 20 minutes using a tumbler. This was followed by feed from an upstream feeder to a twin-screw extruder (TEX30α, The Japan Steel Works, Ltd.) provided with a single vent, and, while feeding component C in the proportions (mass parts) given in Tables 2 to 6 from along the barrel, kneading was carried out using conditions of a rotation rate of 250 rpm, an extrusion rate of 40 kg/hour, and a barrel temperature of 260° C. The molten resin was extruded in strand form and was quenched in a water tank and converted to pellets using a pelletizer to obtain pellets of the resin composition.

[Test Specimen Fabrication]

The pellets yielded by the aforementioned production method were dried for 5 hours at 80° C. and were then injection molded using an injection molder (SE100DU, Sumitomo Heavy Industries, Ltd.) under conditions of a cylinder temperature of 270° C. and a mold temperature of 40° C. to mold a length 125 mm×width 13 mm×thickness 1.5 mm test specimen for the UL94-5V test.

Pellets similarly yielded by the aforementioned production method were dried for 5 hours at 80° C. and were then injection molded using an injection molder (NEX80III, mold clamping force=80T, Nissei Plastic Industrial Co., Ltd.) under conditions of a cylinder temperature of 270° C. and a mold temperature of 40° C. to mold an ISO multipurpose test specimen (3 mm).

[Evaluation of Flame Retardancy]

The flame retardancy was evaluated on each resin composition in conformity with the UL94-5V standard after conditioning the UL test specimen (thickness=1.5 mm) prepared as described above for 48 hours in a constant temperature chamber at a temperature of 23° C. and a humidity of 50%.

[Impact Resistance (Charpy Impact Value)]

This was evaluated by measuring the notched Charpy impact strength (unit: $kJ/m^2$) in conformity with ISO 179 on the ISO multipurpose test specimen (3 mm) prepared as described above by molding at 270° C.

[Initial Hue (Initial b Value)]

The pellets yielded by the aforementioned production method were dried for 5 hours at 80° C. and were then injection molded using an injection molder (SE100DU, Sumitomo Heavy Industries, Ltd.) under conditions of a cylinder temperature of 270° C. and a mold temperature of 40° C. to obtain a three-step plate having a region with a thickness of 1.0 mm, a region with a thickness of 2.0 mm, and a region with a thickness of 3.0 mm.

The initial hue (initial b value) was measured on the 3.0 mm-thick region of the three-step plate using a spectrophotometer (CM3600d, Konica Minolta, Inc.) set to a light source of D65 and a 10' field of view and using SCI normal measurement mode.

[Hue after Moist Heat Testing (b Value after Moist Heat Testing)]

The three-step plate was then held for 1,000 hours at 65° C. and a humidity of 85%, after which the hue after moist heat testing (b value after moist heat testing) was measured.

The results of the preceding evaluations are given in Tables 2 to 6.

TABLE 2

| Component | Signal | Example 1 | 2 | 3 | 4 | 5 | 6 | 7 | 8 | 9 | 10 | 11 |
|---|---|---|---|---|---|---|---|---|---|---|---|---|
| polycarbonate resin (A) | A1 | 22 | 22 | 22 | 22 | 22 | 22 | 22 | 22 | 22 | 22 | 22 |
| | A2 | | | | | | | | | | | |
| | A3 | 78 | 78 | 78 | 78 | 78 | 78 | 78 | 78 | 78 | 78 | 78 |
| ABS resin (B) | B1 | 22 | 22 | 22 | 22 | 22 | 25 | 22 | 16 | 22 | 22 | 22 |
| | B2 | | | | | | | | | | | |
| | B3 | | | | | | | | | | | |
| phosphate ester (C) | C | 22 | 22 | 22 | 22 | 22 | 22 | 22 | 19 | 22 | 22 | 22 |
| phosphite antioxidant (D) | D | 0.08 | 0.08 | 0.08 | 0.08 | 0.01 | 0.01 | 0.01 | 0.01 | 0.003 | 0.25 | 0.01 |
| di-t-butylphenol (E) | E | 0.007 | 0.02 | 0.003 | 0.0008 | 0.0008 | 0.0008 | 0.0008 | 0.0008 | 0.0008 | 0.06 | 0.0008 |
| core/shell elastomer (F) | F1 | 8 | 8 | 8 | 8 | 8 | 6 | 10 | 8 | 8 | 8 | 8 |
| talc (G) | G | 2 | 2 | 2 | 2 | 2 | 2 | 4 | 2 | 2 | 2 | 2 |
| white pigment (H) | H | 1.6 | 1.6 | 1.6 | 1.6 | 1.6 | 1.6 | 1.6 | 1.6 | 1.6 | 1.6 | 1.6 |
| fluoropolymer | I | 0.5 | 0.5 | 0.5 | 0.5 | 0.5 | 0.5 | 0.5 | 0.5 | 0.5 | 0.5 | 0.5 |
| mold-release agent | J | 0.4 | 0.4 | 0.4 | 0.4 | 0.4 | 0.4 | 0.4 | 0.4 | 0.4 | 0.4 | 0.4 |
| E/D mass ratio | | 0.0875 | 0.25 | 0.0375 | 0.01 | 0.08 | 0.08 | 0.08 | 0.08 | 0.267 | 0.24 | 0.08 |
| D + E total amount | | 0.087 | 0.1 | 0.083 | 0.0808 | 0.0108 | 0.0108 | 0.0108 | 0.0108 | 0.0038 | 0.31 | 0.0108 |
| Charpy impact value ($kJ/m^2$) | | 9 | 10 | 9 | 10 | 10 | 9 | 9 | 10 | 9 | 9 | 10 |
| UL94-5V test (1.5 mmt) | | 5VB | 5VB | 5VB | 5VB | 5VB | 5VB | 5VB | 5VB | 5VB | 5VB | 5VB |
| initial b value | | 1.6 | 1.5 | 1.7 | 1.7 | 1.7 | 1.6 | 1.7 | 1.5 | 1.8 | 1.8 | 1.7 |
| b value after moist heat testing | | 2.5 | 2.6 | 2.8 | 2.6 | 2.5 | 2.4 | 2.6 | 2.4 | 2.7 | 2.5 | 2.7 |

TABLE 3

| Component | Signal | Comparative Example 1 | 2 | 3 | 4 | 5 |
|---|---|---|---|---|---|---|
| polycarbonate resin (A) | A1 | 22 | 22 | 22 | 22 | 22 |
| | A2 | | | | | |
| | A3 | 78 | 78 | 78 | 78 | 78 |
| ABS resin (B) | B1 | 22 | 22 | 22 | 22 | 22 |
| | B2 | | | | | |
| | B3 | | | | | |
| posphate ester (C) | C | 22 | 22 | 22 | 22 | 22 |
| phosphite antioxidant (D) | D | 0.08 | 1.2 | 0.25 | 1.5 | 0.0005 |
| di-t-butylphenol (E) | E | | 0.09 | 0.12 | 0.14 | 0.002 |
| core/shell elastomer (F) | F1 | 8 | 8 | 8 | 8 | 8 |

TABLE 3-continued

| Component | Signal | Comparative Example | | | | |
|---|---|---|---|---|---|---|
| | | 1 | 2 | 3 | 4 | 5 |
| talc (G) | G | 2 | 2 | 2 | 2 | 2 |
| white pigment (H) | H | 1.6 | 1.6 | 1.6 | 1.6 | 1.6 |
| fluoropolymer | I | 0.5 | 0.5 | 0.5 | 0.5 | 0.5 |
| mold-release agent | J | 0.4 | 0.4 | 0.4 | 0.4 | 0.4 |
| E/D mass ratio | | — | 0.075 | 0.48 | 0.0933 | 4 |
| D + E total amount | | 0.08 | 1.29 | 0.37 | 1.64 | 0.0025 |
| Charpy impact value (kJ/m$^2$) | | 10 | 7 | 5 | 4 | 11 |
| UL94-5V test (1.5 mmt) | | 5VB | 5VB | 5VB | 5VB | 5VB |
| initial b value | | 2.1 | 1.6 | 1.7 | 1.6 | 2.4 |
| b value after moist heat testing | | 3.4 | 3.5 | 3.9 | 4.5 | 3.3 |

TABLE 4

| Component | Signal | Example | | Comparative Example | |
|---|---|---|---|---|---|
| | | 12 | 13 | 6 | 7 |
| polycarbonate resin (A) | A1 | 22 | 22 | 22 | 22 |
| | A2 | 78 | 78 | 78 | 78 |
| | A3 | | | | |
| ABS resin (B) | B1 | 22 | 22 | 22 | 22 |
| | B2 | | | | |
| | B3 | | | | |
| phosphate ester (C) | C | 22 | 22 | 22 | 22 |
| phosphite antioxidant (D) | D | 0.08 | 0.08 | 0.08 | 0.1 |
| di-t-butylphenol (E) | E | 0.004 | 0.0005 | | 0.15 |
| core/shell elastomer (F) | F1 | 8 | 8 | 8 | 8 |
| talc (G) | G | 2 | 2 | 2 | 2 |
| white pigment (H) | H | 1.6 | 1.6 | 1.6 | 1.6 |
| fluoropolymer | I | 0.5 | 0.5 | 0.5 | 0.5 |
| mold-release agent | J | 0.4 | 0.4 | 0.4 | 0.4 |
| E/D mass ratio | | 0.05 | 0.00625 | — | 1.5 |
| D + E total amount | | 0.084 | 0.0805 | 0.08 | 0.25 |

TABLE 4-continued

| Component | Signal | Example | | Comparative Example | |
|---|---|---|---|---|---|
| | | 12 | 13 | 6 | 7 |
| Charpy impact value (kJ/m$^2$) | | 18 | 20 | 20 | 19 |
| UL94-5V test (1.5 mmt) | | 5VB | 5VB | 5VB | 5VB |
| initial b value | | 2.1 | 2.2 | 2.6 | 2.0 |
| b value after moist heat testing | | 3.2 | 3.1 | 3.5 | 4.2 |

TABLE 5

| Component | Signal | Example | | Comparative Example | |
|---|---|---|---|---|---|
| | | 14 | 15 | 8 | 9 |
| polycarbonate resin (A) | A1 | | | | |
| | A2 | 100 | 100 | 100 | 100 |
| | A3 | | | | |
| ABS resin (B) | B1 | | | | |
| | B2 | 24 | 24 | 24 | 24 |
| | B3 | 12 | 12 | 12 | 12 |
| phosphate ester (C) | C | 26 | 26 | 26 | 26 |
| phosphite antioxidant (D) | D | 0.02 | 0.1 | 0.01 | 0.1 |
| di-t-butylphenol (E) | E | 0.001 | 0.002 | | 0.2 |
| core/shell elastomer (F) | F1 | | | | |
| talc (G) | G | 2 | 2 | 2 | 2 |
| white pigment (H) | H | 3 | 3 | 3 | 3 |
| fluoropolymer | I | 0.7 | 0.7 | 0.7 | 0.7 |
| mold-release agent | J | 0.5 | 0.5 | 0.5 | 0.5 |
| E/D mass ratio | | 0.05 | 0.02 | — | 2 |
| D + E total amount | | 0.021 | 0.102 | 0.01 | 0.3 |
| Charpy impact value (kJ/m$^2$) | | 12 | 13 | 13 | 13 |
| UL94-5V test (1.5 mmt) | | 5VB | 5VB | 5VB | 5VB |
| initial b value | | 1.7 | 1.6 | 2.3 | 1.6 |
| b value after moist heat testing | | 2.8 | 2.8 | 3.3 | 3.9 |

TABLE 6

| Component | Signal | Example | | | | | Comparative Example | |
|---|---|---|---|---|---|---|---|---|
| | | 16 | 17 | 18 | 19 | 20 | 10 | 11 |
| polycarbonate resin (A) | A1 | 30 | 30 | 30 | 30 | 30 | 30 | 30 |
| | A2 | | | | | | | |
| | A3 | 70 | 70 | 70 | 70 | 70 | 70 | 70 |
| ABS resin (B) | B1 | 13 | 13 | 13 | 13 | 13 | 13 | 13 |
| | B2 | | | | | | | |
| | B3 | | | | | | | |
| phosphate ester (C) | C | 18 | 18 | 18 | 18 | 18 | 18 | 18 |
| phosphite antioxidant (D) | D | 0.1 | 0.15 | 0.15 | 0.15 | 0.008 | 0.1 | 0.1 |
| di-t-butylphenol (E) | E | 0.0005 | 0.015 | 0.015 | 0.015 | 0.00005 | | 0.13 |
| core/shell elastomer (F) | F1 | 6 | 6 | 6 | 6 | 6 | 6 | 6 |
| white pigment (H) | H | 1.5 | 1.5 | 1.5 | 1.5 | 1.5 | 1.5 | 1.5 |
| fluoropolymer | I | 0.5 | 0.5 | 0.5 | 0.5 | 0.5 | 0.5 | 0.5 |
| mold-release agent | J | 0.4 | 0.4 | 0.4 | 0.4 | 0.4 | 0.4 | 0.4 |

TABLE 6-continued

|  |  | Example | | | | | Comparative Example | |
|---|---|---|---|---|---|---|---|---|
| Component | Signal | 16 | 17 | 18 | 19 | 20 | 10 | 11 |
| phenolic compound other than E | K1 |  |  | 0.0001 |  |  |  |  |
|  | K2 |  |  |  | 0.0001 |  |  | 1.3 |
| E/D mass ratio |  | 0.005 | 0.1 | 0.1 | 0.1 | 0.00625 | — | 1.3 |
| D + E total amount |  | 0.1005 | 0.165 | 0.165 | 0.165 | 0.00805 | 0.1 | 0.23 |
| Charpy impact value (kJ/m²) |  | 12 | 11 | 11 | 11 | 12 | 12 | 11 |
| UL94-5V test (1.5 mmt) |  | 5VB | 5VB | 5VB | 5VB | 5VB | 5VB | 5VB |
| initial b value |  | 1.5 | 1.4 | 1.3 | 1.5 | 1.6 | 2.0 | 1.4 |
| b value after moist heat testing |  | 2.6 | 2.5 | 2.6 | 2.7 | 2.6 | 3.3 | 3.4 |

Examples 21 to 29 and Comparative Examples 12 to 21

[Resin Pellet Production]

The components indicated in Table 1, except for component C, were blended in the proportions (given in mass parts in all instances) given in Tables 7, 8, and below, and were mixed for 20 minutes using a tumbler. This was followed by feed from an upstream feeder to a twin-screw extruder (TEX30α, The Japan Steel Works, Ltd.) provided with a single vent, and, while feeding component C in the proportions (mass parts) given in Tables 7 and 8 from along the barrel, kneading was carried out using conditions of a rotation rate of 250 rpm, an extrusion rate of 40 kg/hour, and a barrel temperature of 260° C. The molten resin was extruded in strand form and was quenched in a water tank and converted to pellets using a pelletizer to obtain pellets of the resin composition.

[Test Specimen Fabrication]

The pellets yielded by the aforementioned production method were dried for 5 hours at 80° C. and were then injection molded using an injection molder (SE100DU, Sumitomo Heavy Industries, Ltd.) under conditions of a cylinder temperature of 300° C. and a mold temperature of 40° C. to mold length 125 mm×width 13 mm×thickness 0.8 mm and thickness 1.5 mm test specimens for UL testing.

Pellets similarly yielded by the aforementioned production method were dried for 5 hours at 80° C. and were then injection molded using an injection molder (NEX80III, mold clamping force=80T, Sumitomo Heavy Industries, Ltd.) under conditions of a cylinder temperature of 300° C. and a mold temperature of 40° C. to mold an ISO multi-purpose test specimen (3 mm).

[Evaluation of Flame Retardancy]

After conditioning the UL test specimens prepared as described above for 48 hours in a constant temperature chamber at a temperature of 23° C. and a humidity of 50%, the flame retardancy was evaluated on each resin composition in conformity with the UL94-5V standard using the 1.5 mm-thick test specimen and in conformity with the UL94-V standard using the 0.8 mm-thick test specimen.

The impact resistance (Charpy impact value), initial hue (initial b value), and hue after moist heat testing (b value after moist heat testing) were evaluated proceeding as described above.

The results of the evaluations are given in Tables 7 and 8.

TABLE 7

|  |  | Example | | | | | Comparative Example | | | | |
|---|---|---|---|---|---|---|---|---|---|---|---|
| Component | Signal | 21 | 22 | 23 | 24 | 25 | 12 | 13 | 14 | 15 | 16 |
| polycarbonate resin (A) | A1 | 24 | 24 | 24 | 24 | 24 | 24 | 24 | 24 | 24 | 24 |
|  | A2 |  |  |  |  |  |  |  |  |  |  |
|  | A3 | 76 | 76 | 76 | 76 | 76 | 76 | 76 | 76 | 76 | 76 |
| phosphate ester (C) | C | 18 | 18 | 18 | 18 | 18 | 18 | 18 | 18 | 18 | 18 |
| phosphite antioxidant (D) | D | 0.005 | 0.01 | 0.05 | 0.2 | 0.7 | 0.02 | 1.2 | 0.4 | 1.4 | 0.0005 |
| di-t-butylphenol (E) | E | 0.0006 | 0.0015 | 0.022 | 0.06 | 0.09 |  | 0.05 | 0.12 | 0.16 | 0.0015 |
| core/shell elastomer (F) | F1 | 8 | 8 | 8 | 8 | 8 | 8 | 8 | 8 | 8 | 8 |
|  | F2 |  |  |  |  |  |  |  |  |  |  |
| white pigment (G) | H | 1.3 | 1.3 | 1.3 | 1.3 | 1.3 | 1.3 | 1.3 | 1.3 | 1.3 | 1.3 |
| fluoropolymer | I | 0.5 | 0.5 | 0.5 | 0.5 | 0.5 | 0.5 | 0.5 | 0.5 | 0.5 | 0.5 |
| mold-release agent | J | 0.4 | 0.4 | 0.4 | 0.4 | 0.4 | 0.4 | 0.4 | 0.4 | 0.4 | 0.4 |
| D/C mass ratio |  | 0.12 | 0.15 | 0.114 | 0.3 | 0.129 | — | 0.0417 | 0.3 | 0.114 | 3 |
| C + D total amount |  | 0.0056 | 0.0115 | 0.072 | 0.26 | 0.79 | 0.02 | 1.25 | 0.52 | 1.56 | 0.002 |
| Charpy impact value (kJ/m²) |  | 22 | 24 | 23 | 23 | 22 | 26 | 11 | 13 | 12 | 25 |
| UL94-5V test (1.5 mmt) |  | 5VB | 5VB | 5VB | 5VB | 5VB | 5VB | 5VB | 5VB | 5VB | 5VB |

TABLE 7-continued

| | | Example | | | | | Comparative Example | | | | |
|---|---|---|---|---|---|---|---|---|---|---|---|
| Component | Signal | 21 | 22 | 23 | 24 | 25 | 12 | 13 | 14 | 15 | 16 |
| initial b value | | 0.7 | 0.7 | 0.8 | 0.6 | 0.9 | 1.6 | 0.7 | 0.6 | 0.9 | 1.5 |
| b value after moist heat testing | | 1.5 | 1.7 | 1.6 | 1.7 | 1.6 | 2.1 | 2.5 | 2.9 | 3.5 | 2.6 |

TABLE 8

| | | Example | | | | Comparative Example | | | | |
|---|---|---|---|---|---|---|---|---|---|---|
| Component | Signal | 26 | 27 | 28 | 29 | 17 | 18 | 19 | 20 | 21 |
| polycarbonate resin (A) | A1 | 15 | 15 | 15 | 15 | 15 | 15 | 15 | 15 | 15 |
| | A2 | 85 | 85 | 85 | 85 | 85 | 85 | 85 | 85 | 85 |
| | A3 | | | | | | | | | |
| phosphate ester (C) | C | 12 | 12 | 12 | 12 | 12 | 12 | 12 | 12 | 12 |
| phosphite antioxidant (D) | D | 0.005 | 0.02 | 0.1 | 0.4 | 0.1 | 1.2 | 0.3 | 1.2 | 0.0005 |
| di-t-butylphenol (E) | E | 0.0005 | 0.007 | 0.015 | 0.06 | | 0.05 | 0.15 | 0.15 | 0.001 |
| core/shelf elastomer (F) | F1 | | | | | | | | | |
| | F2 | 6 | 6 | 6 | 6 | 6 | 6 | 6 | 6 | 6 |
| white pigment (G) | H | 1.3 | 1.3 | 1.3 | 1.3 | 1.3 | 1.3 | 1.3 | 1.3 | 1.3 |
| fluoropolymer | I | 0.4 | 0.4 | 0.4 | 0.4 | 0.4 | 0.4 | 0.4 | 0.4 | 0.4 |
| mold-release agent | J | 0.2 | 0.2 | 0.2 | 0.2 | 0.2 | 0.2 | 0.2 | 0.2 | 0.2 |
| D/C mass ratio | | 0.1 | 0.35 | 0.15 | 0.15 | — | 0.0417 | 0.5 | 0.125 | 2 |
| C + D total amount | | 0.0055 | 0.027 | 0.115 | 0.46 | 0.1 | 1.25 | 0.45 | 1.35 | 0.0015 |
| Charpy impact value (kJ/m$^2$) | | 45 | 47 | 44 | 43 | 48 | 31 | 35 | 29 | 47 |
| UL94-V test (0.8 mmt) | | V-0 | V-0 | V-0 | V-0 | V-0 | V-1 | V-0 | V-1 | V-0 |
| initial b value | | 0.8 | 0.7 | 0.7 | 0.8 | 1.4 | 0.7 | 0.9 | 0.9 | 1.4 |
| b value after moist heat testing | | 1.5 | 1.4 | 1.6 | 1.7 | 2.0 | 2.1 | 2.5 | 3.3 | 2.4 |

Examples 30 to 33 and Comparative Examples 22 to 25

[Resin Pellet Production]

The components indicated in Table 1, except for component C, were blended in the proportions (given in mass parts in all instances) given in Table 9 and were mixed for 20 minutes using a tumbler. This was followed by feed from an upstream feeder to a twin-screw extruder (TEX30α, The Japan Steel Works, Ltd.) provided with a single vent, and, while feeding component C in the proportions (mass parts) given in Table 9 from along the barrel, kneading was carried out using conditions of a rotation rate of 250 rpm, an extrusion rate of 40 kg/hour, and a barrel temperature of 260° C. The molten resin was extruded in strand form and was quenched in a water tank and converted to pellets using a pelletizer to obtain pellets of the resin composition.

[Test Specimen Fabrication]

The pellets yielded by the aforementioned production method were dried for 5 hours at 80° C. and were then injection molded using an injection molder (SE100DU, Sumitomo Heavy Industries, Ltd.) under conditions of a cylinder temperature of 270° C. and a mold temperature of 40° C. to mold a length 125 mm×width 13 mm×thickness 1.5 mm test specimen for the UL94-5V test.

Pellets similarly yielded by the aforementioned production method were dried for 5 hours at 80° C. and were then injection molded using an injection molder (NEX80III, mold clamping force=80T, Nissei Plastic Industrial Co., Ltd.) under conditions of a cylinder temperature of 270° C. and a mold temperature of 40° C. to mold an ISO multipurpose test specimen (3 ram).

The flame retardancy (UL94-5V, 1.5 mm thickness), impact resistance (Charpy impact value), initial hue (initial b value), and hue after moist heat testing (b value after moist heat testing) were measured proceeding as described above.

The results of the evaluations are given in Table 9.

TABLE 9

| | | Example | | | | Comparative Example | | | |
|---|---|---|---|---|---|---|---|---|---|
| Component | Signal | 30 | 31 | 32 | 33 | 22 | 23 | 24 | 25 |
| polycarbonate resin (A) | A1 | | | | | | | | |
| | A2 | 32 | 32 | 32 | 32 | 32 | 32 | 32 | 32 |
| | A3 | 68 | 68 | 68 | 68 | 68 | 68 | 68 | 68 |

TABLE 9-continued

|  |  | Example | | | | Comparative Example | | | |
| --- | --- | --- | --- | --- | --- | --- | --- | --- | --- |
| Component | Signal | 30 | 31 | 32 | 33 | 22 | 23 | 24 | 25 |
| ABS resin (B) | B1 | 6 | 6 | 6 | 6 | 6 | 6 | 6 | 6 |
| phosphate ester (C) | C | 17 | 17 | 17 | 17 | 17 | 17 | 17 | 17 |
| phosphite antioxidant (D) | D | 0.05 | 0.05 | 0.1 | 0.2 | 0.05 | 0.05 | 1.2 | 0.0007 |
| di-t-butylphenol (E) | E | 0.003 | 0.01 | 0.03 | 0.005 |  | 0.2 | 0.003 | 0.005 |
| core/shell elastomer (F) | F1 F2 | 5 | 5 | 5 | 5 | 5 | 5 | 5 | 5 |
| white pigment (H) | H | 1.3 | 1.3 | 1.3 | 1.3 | 1.3 | 1.3 | 1.3 | 1.3 |
| fluoropolymer | I | 0.5 | 0.5 | 0.5 | 0.5 | 0.5 | 0.5 | 0.5 | 0.5 |
| mold-release agent | J | 0.4 | 0.4 | 0.4 | 0.4 | 0.4 | 0.4 | 0.4 | 0.4 |
| D/C mass ratio |  | 0.06 | 0.2 | 0.3 | 0.025 | — | 4 | 0.0025 | 7.1429 |
| C + D total amount |  | 0.053 | 0.06 | 0.13 | 0.205 | 0.05 | 0.25 | 1.203 | 0.0057 |
| Charpy impact value (kJ/m$^2$) |  | 13 | 12 | 14 | 13 | 13 | 12 | 8 | 13 |
| UL94-5V test (1.5 mmt) |  | 5VB | 5VB | 5VB | 5VB | 5VB | 5VB | 5VB | 5VB |
| initial b value |  | 1.1 | 1.2 | 1.0 | 1.1 | 1.5 | 1.2 | 1.1 | 1.7 |
| b value after moist heat testing |  | 2.0 | 1.9 | 2.0 | 2.2 | 2.7 | 3.0 | 3.1 | 2.8 |

INDUSTRIAL APPLICABILITY

The polycarbonate resin composition according to the present invention has a heat stability sufficiently high to withstand high-temperature molding, has an excellent flame retardancy and impact resistance, and in addition exhibits an excellent hue and moist heat resistance, and for these reasons can be advantageously used for, for example, components and parts for electrical and electronic equipment and devices, office automation equipment, information terminal equipment, machine parts, household electrical appliances and consumer electronics, vehicle components, building members, various containers, lighting equipment, and so forth.

The invention claimed is:

1. A polycarbonate resin composition, comprising, per 100 mass parts of a polycarbonate resin (A):
0 to 40 mass parts of a graft copolymer (B) comprising an aromatic vinyl monomer component (b1), a vinyl cyanide monomer component (b2), and a diene rubber polymer component (b3);
10 to 30 mass parts of a phosphate ester compound (C);
0.001 to 1.0 mass parts of a phosphite antioxidant (D); and
0.00001 to 0.1 mass parts of 2,4-di-tert-butylphenol (E),
wherein if a polyester resin is present in the polycarbonate resin composition, a mass content of the polyester resin is not more than 10 mass parts per 100 mass parts of the polycarbonate resin (A).

2. The polycarbonate resin composition according to claim 1, comprising, per 100 mass parts of the polycarbonate resin (A):
10 to 40 mass parts of the graft copolymer (B) comprising the aromatic vinyl monomer component (b1), the vinyl cyanide monomer component (b2), and the diene rubber polymer component (b3), and
15 to 30 mass parts of the phosphate ester compound (C).

3. The polycarbonate resin composition according to claim 1, comprising, per 100 mass parts of the polycarbonate resin (A):
at least 0 mass parts and less than 10 mass parts of the graft copolymer (B) comprising the aromatic vinyl monomer component (b1), the vinyl cyanide monomer component (b2), and the diene rubber polymer component (b3), and
10 to 25 mass parts of the phosphate ester compound (C).

4. The polycarbonate resin composition according to claim 1, wherein the phosphite antioxidant (D) is tris(2,4-di-tert-butylphenyl) phosphite.

5. The polycarbonate resin composition according to claim 1, further comprising 1 to 20 mass parts of a core/shell elastomer (F) per 100 mass parts of the polycarbonate resin (A).

6. The polycarbonate resin composition according to claim 1, further comprising 1 to 10 mass parts of a talc (G) per 100 mass parts of the polycarbonate resin (A).

7. The polycarbonate resin composition according to claim 1, further comprising 0.01 to 7 mass parts of a white pigment (H) per 100 mass parts of the polycarbonate resin (A).

8. The polycarbonate resin composition according to claim 7, wherein the white pigment (H) is titanium oxide.

9. The polycarbonate resin composition according to claim 1, wherein a total of the contents of the phosphite antioxidant (D) and the 2,4-di-tert-butylphenol (E) is 0.002 to 1 mass parts per 100 mass parts of the polycarbonate resin (A).

10. The polycarbonate resin composition according to claim 1, wherein a mass ratio (E)/(D) between the 2,4-di-tert-butylphenol (E) and the phosphite antioxidant (D) is in a range of 0.001 to 1.

11. A molded article obtained by molding the polycarbonate resin composition according to claim 1.

* * * * *